(12) United States Patent
Son et al.

(10) Patent No.: US 9,423,569 B2
(45) Date of Patent: Aug. 23, 2016

(54) METHOD AND APPARATUS FOR ALIGNING OPTICAL ELEMENT

(71) Applicant: Optomind Inc., Suwon-si, Gyeonggi-do (KR)

(72) Inventors: Yung-sung Son, Yongin-si (KR); Bong-cheol Kim, Seoul (KR)

(73) Assignee: OPTOMIND INC. (KR)

( * ) Notice: Subject to any disclaimer, the term of this patent is extended or adjusted under 35 U.S.C. 154(b) by 0 days.

(21) Appl. No.: 14/750,211

(22) Filed: Jun. 25, 2015

(65) Prior Publication Data

US 2015/0293309 A1 Oct. 15, 2015

Related U.S. Application Data

(63) Continuation of application No. PCT/KR2014/011589, filed on Nov. 28, 2014.

(30) Foreign Application Priority Data

Nov. 28, 2013 (KR) .......................... 10-2013-0146596

(51) Int. Cl.
*G02B 6/00* (2006.01)
*G02B 6/36* (2006.01)
*G02B 6/46* (2006.01)
*G02B 6/42* (2006.01)

(52) U.S. Cl.
CPC .............. *G02B 6/3616* (2013.01); *G02B 6/423* (2013.01); *G02B 6/4214* (2013.01); *G02B 6/4224* (2013.01); *G02B 6/4227* (2013.01); *G02B 6/46* (2013.01); *G02B 6/3652* (2013.01)

(58) Field of Classification Search
CPC .............................. G02B 6/3616; G02B 6/4214
USPC ........................................................... 385/137
See application file for complete search history.

(56) References Cited

U.S. PATENT DOCUMENTS

| 2013/0129281 | A1* | 5/2013 | Son ....................... G02B 6/4214 385/33 |
| 2013/0308910 | A1 | 11/2013 | Nishimura et al. |
| 2014/0332672 | A1* | 11/2014 | Sheu ..................... G02B 6/426 250/216 |
| 2015/0301286 | A1* | 10/2015 | Chan .................... G02B 6/3825 385/56 |
| 2016/0016218 | A1* | 1/2016 | Li ........................ G02B 6/4214 385/137 |

FOREIGN PATENT DOCUMENTS

| JP | 2008-158473 A | 7/2008 |
| JP | 2013-134347 A | 7/2013 |
| JP | 2013-213949 A | 10/2013 |
| KR | 10-2008-0040416 | 8/2008 |
| KR | 10-2012-0029673 | 3/2012 |
| KR | WO 2015080533 A1 * | 6/2015 ........... G02B 6/4214 |

\* cited by examiner

*Primary Examiner* — Sung Pak
(74) *Attorney, Agent, or Firm* — Harness, Dickey & Pierce, P.L.C.

(57) ABSTRACT

A structure for aligning an optical element includes a baseplate including a set position for mounting at least one optical element, a first reference hole, and a second reference hole spaced by a first distance from the first reference hole. The set position is determined by a first baseline that passes the first reference hole and the second reference hole and a second baseline that intersects with the first baseline at a second distance from the first reference hole on an opposite side to the second reference hole with respect to the first reference hole. The second distance is shorter than the first distance.

20 Claims, 18 Drawing Sheets

METHOD AND APPARATUS FOR ALIGNING OPTICAL ELEMENT

CROSS-REFERENCE TO RELATED APPLICATIONS

This application is a continuation of International Application No. PCT/KR2014/011589, filed Nov. 28, 2014, which is based upon and claims the benefit of priority from Korean Patent Application No. 10-2013-0146596, filed Nov. 28, 2013, the full disclosures of which are incorporated herein by reference.

BACKGROUND

1. Field

The present disclosure relates to a method of aligning an optical element, and more particularly, to a method of aligning an optical element by using two round holes on a substrate.

2. Description of the Related Art

The statements in this section merely provide background information related to the present disclosure and do not constitute prior art.

A signal transmission method based on an optical fiber, which is widely used in a long haul communication, is in widespread use for a large-capacity digital media transmission including a high-definition digital video display device for which high-speed and high-density data transmission is required, owing to the operation characteristics unaffected by an electromagnetic interference (EMI) and usefulness in a broad frequency band of the optical fiber.

Such a signal transmission method based on the optical fiber can be implemented by arranging a lens and a reflecting member between an optical fiber and an optical element. In order to achieve such configuration, a method of performing an optical alignment can be used by mounting a structure including the optical fiber, the reflecting member, and the lens in a fixed manner on a substrate on which the optical element is mounted.

In an optical transceiver manufactured by using the above-mentioned optical alignment method, the structure can be simplified, the manufacturing cost can be reduced, and durability and precision can be enhanced depending on how the optical element, the lens, the reflecting member, and the optical fiber are aligned, and hence the optical alignment issue is getting an attention.

However, an optical transceiver manufactured by performing an optical alignment of the conventional method is not only highly costly but also bulky, causing a problem in using it in a mobile communication apparatus such as a smartphone, in addition to a problem in ensuring the stability due to a complicated structure.

SUMMARY

An apparatus for aligning an optical element, according to some embodiments of the present disclosure, includes a baseplate including a set position for mounting at least one optical element, a first reference hole, and a second reference hole spaced by a first distance from the first reference hole. The set position is determined by a first baseline that passes the first reference hole and the second reference hole and a second baseline that intersects with the first baseline at a second distance from the first reference hole on an opposite side to the second reference hole with respect to the first reference hole. The second distance is shorter than the first distance.

A method of aligning an optical element, according to some embodiments of the present disclosure, includes preparing a baseplate including a set position for mounting at least one optical element, a first reference hole, and a second reference hole spaced by a first distance from the first reference hole, and mounting the at least one optical element at the set position on the baseplate. The set position is determined by a first baseline that passes the first reference hole and the second reference hole and a second baseline that intersects with the first baseline at a second distance from the first reference hole on an opposite side to the second reference hole with respect to the first reference hole. The second distance is shorter than the first distance.

A method of aligning an optical element, according to some embodiments of the present disclosure, includes preparing a baseplate including a set position for mounting at least one optical element, a first reference hole, and a second reference hole spaced by a first distance from the first reference hole, mounting at least one optical element at the set position, preparing an optical-fiber-fixing block for mounting at least an optical fiber and a lens unit in a fixed manner, which includes a first post configured to be inserted into the first reference hole and a second post configured to be inserted into the second reference hole, and mounting the optical-fiber-fixing block on the baseplate by inserting the first post into the first reference hole and inserting the second post into the second reference hole. The set position is determined by a first baseline that passes the first reference hole and the second reference hole and a second baseline that intersects with the first baseline at a second distance from the first reference hole on an opposite side to the second reference hole with respect to the first reference hole. The second distance is shorter than the first distance.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
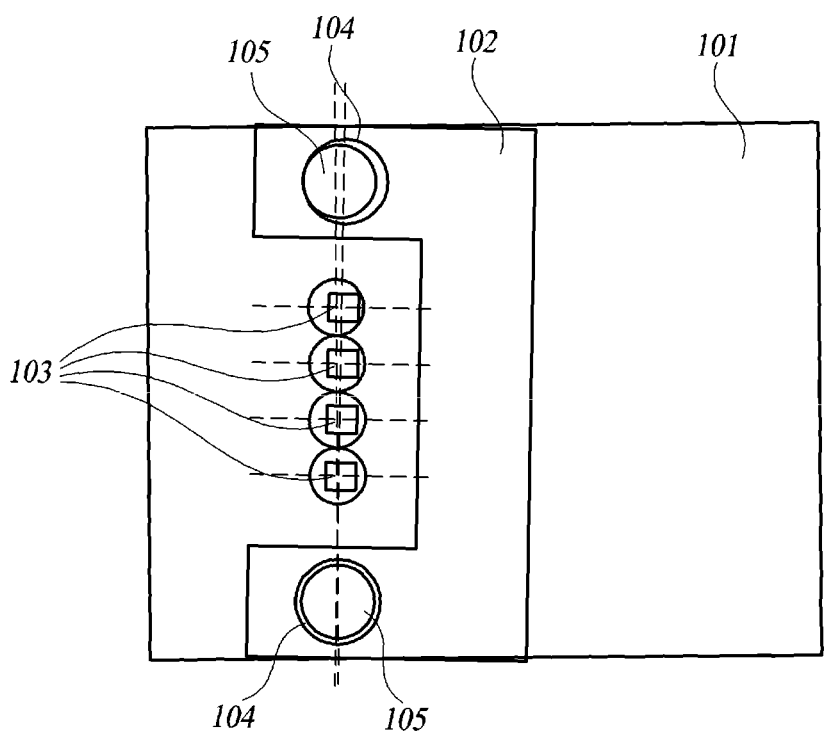
FIG. 1 is a schematic diagram for illustrating a conventional method of aligning an optical element.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

Additionally, various terms such as first, second, A, B, etc., are used solely for the purpose of differentiating one component from the other but not to imply or suggest the substances, the order or sequence of the components. In the entire specification, when a portion "comprises" or "includes" a constituent element, this does not mean to exclude another constituent element unless otherwise described particularly in view of the opposite aspect but means that another constituent element can be further included. In addition, terms such as " . . . unit" described in the specification means a unit of processing at least one function or operation, which can be implemented by hardware, software, or a combination of hardware and software.

If a component were described as 'connected', 'coupled', or 'linked' to another component, they may mean the components are not only directly 'connected', 'coupled', or 'linked' but also are indirectly 'connected', 'coupled', or 'linked' via one or more additional components.

In addition, size and shape of a constituent element shown in the drawings may be exaggerated for the sake of clear description and convenience. Further, terms specially defined considering configuration and operation of the present disclosure are merely for describing embodiments of the present disclosure, but not limiting the scope of the present disclosure.

FIG. 1 is a schematic diagram for illustrating a conventional method of aligning an optical element.

An injection molded structure 102 assembled on a substrate 101 is shown in FIG. 1. In general, a hole on the substrate 101 in order to mount another structure to be connected to the substrate 101 is hard to form in a precise manner, and hence the injection molded structure 102 including a precise hole is used as a guide. An optical element 103 is arranged on the substrate 101. The substrate 101 includes two round holes 104 on a line extending in a direction of arranging the optical element 103, and the injection molded structure 102 includes two round posts 105. The two round posts 105 are respectively inserted into the round holes 104, and the optical alignment is achieved by further arranging a lens structure on the assembled injection molded structure 102.

Using the conventional technology, an optical alignment error can be reduced to some extent; however, there still are problems in complexity of assembling an additional part, economical feasibility, and increase in volume of the entire structure.

In addition, due to the characteristics of the structure that hardly provides 100% fitting in the coupling structure of the hole and the post as shown in FIG. 1, when the hole and the post are fixed at one side, there exists a tolerance between the hole and the post at the other side. This causes a certain amount of deviation in the optical alignment, which can act as a critical problem in such a technical field that requires high precision.

[First Embodiment]

Figure 2:
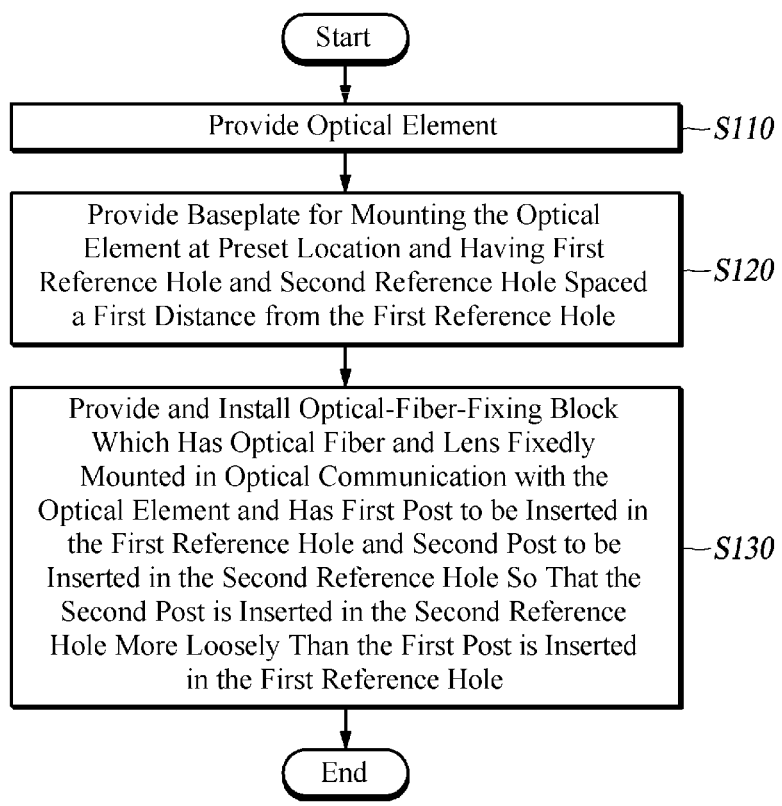
FIG. 2 is a flowchart of a method of aligning an optical element according to a first embodiment of the present disclosure.
Figure 3:
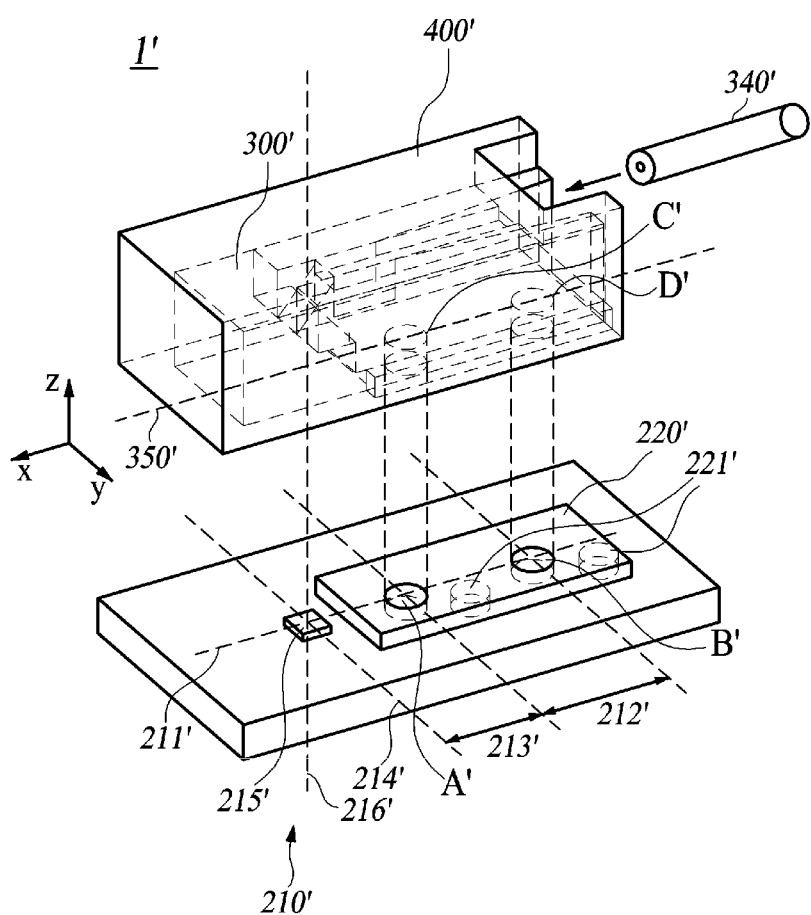
FIG. 3 is a perspective view of an optical transceiver according to the first embodiment.
Figure 4A:
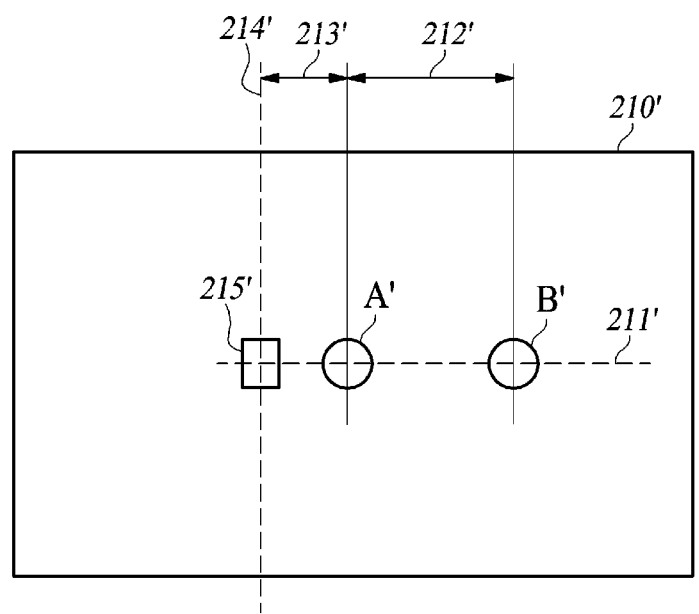
FIG. 4A is a plan view of a baseplate including a first reference hole and a second reference hole, on which an optical element is mounted, according to the first embodiment.
Figure 4B:
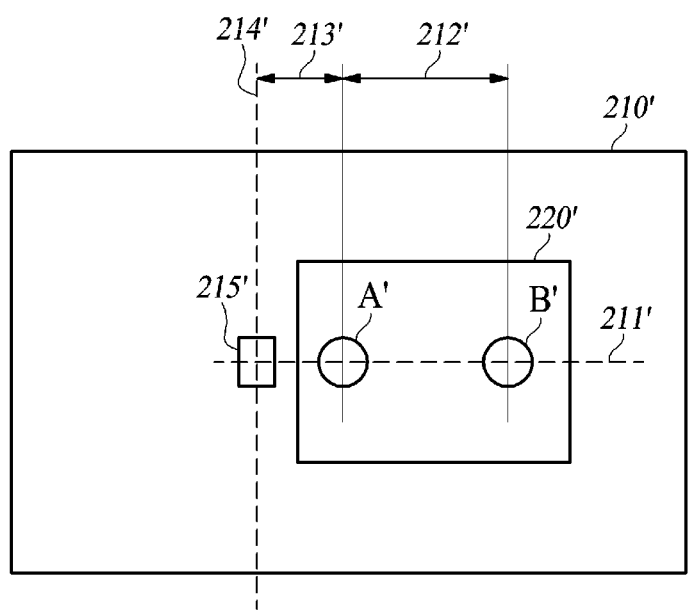
FIG. 4B is a plan view of a baseplate on which an optical element and an alignment plate including a first reference hole and a second reference hole are arranged, according to the first embodiment.

FIG. 2 is a flowchart of a method of aligning an optical element according to a first embodiment of the present disclosure; FIG. 3 is a perspective view of an optical transceiver 1' according to the first embodiment; FIG. 4A is a plan view of a baseplate 210' including a first reference hole A' and a second reference hole B', on which an optical element 215' is mounted, according to the first embodiment; and FIG. 4B is a plan view of a baseplate 210' on which the optical element 215' and an alignment plate 220' including the first reference hole A' and the second reference hole B' are arranged, according to the first embodiment.

Before describing the method of aligning an optical element according to the first embodiment, a configuration of the optical transceiver 1' according to the first embodiment is briefly described. The optical transceiver 1' according to the first embodiment is also referred to as a transmission path expander 1'.

As shown in FIG. 3, in some embodiments, the transmission path expander 1' includes a baseplate 210', an optical-fiber-fixing block 300', and a housing 400'. In some embodiments, the transmission path expander 1' further includes an alignment plate 220' including a mounting portion for mounting the alignment plate 220' on the baseplate 210', a first reference hole A', and a second reference hole B' formed at a first distance 212' from the first reference hole A'.

Referring to FIG. 2, the method of aligning the optical element 215' according to the first embodiment includes a step of preparing the optical element 215' (Step S110) and a step of preparing the baseplate 210' including a set position for arranging the optical element 215', the first reference hole A', and the second reference hole B' formed at the first distance 212' from the first reference hole A' (Step S120).

The set position is determined by a first baseline 211' that passes the first reference hole A' and the second reference hole B' and a second baseline 214' that intersects with the first baseline 211' at a second distance 213' from the first reference hole A' on the opposite side to the second reference hole B' with respect to the first reference hole A'. That is, the first reference hole A' is sandwiched by the second baseline 214' and the second reference hole B'. In some embodiments, the second distance 213' is shorter than the first distance 212'.

The baseplate 210' is described in detail below with reference to FIGS. 4A and 4B.

In some embodiments, the baseplate 210' is a printed circuit board (PCB).

The set position is a portion of the baseplate 210' where the optical element 215' is mounted. In some embodiments, the optical element 215' includes a plurality of optical elements, and in this case, the plurality of optical elements is arranged at the set position. In some embodiments, each of the first reference hole A' and the second reference hole B' is a through hole that passes through the baseplate 210' or the alignment plate 220' from one side to the other side. In some embodiments, each of the first reference hole A' and the second reference hole B' is a recessed structure formed on the baseplate 210' or the alignment plate 220' with a predetermined depth.

In some embodiments, the first baseline 211' and the second baseline 214' are virtual lines, and the set position is determined based on the first baseline 211' and the second baseline 214'

In some embodiments, the set position is on the second baseline 214'. That is, the optical element 215' is mounted on the second baseline 214' on the baseplate 210'. In some embodiments, the optical element 215' is arranged at an intersection of the first baseline 211' and the second baseline 214'.

When the optical element 215' includes a single optical element, as shown in FIG. 4A, the center of a light emitting portion or a light receiving portion of the optical element 215' is located at a point where the first baseline 211' and the second baseline 214' intersect with each other at right angles. When the optical element 215' includes a plurality of optical elements, the plurality of optical elements is arranged in a row or in a plurality of rows on the second baseline 214' along the length direction of the second baseline 214'.

The first baseline 211' is determined by the first reference hole A' and the second reference hole B'. That is, a line that passes through the first reference hole A' and the second reference hole B' is taken as the first baseline 211'. In some embodiments, a line that passes through the center of the first reference hole A' and the center of the second reference hole B' is taken as the first baseline 211'. In this case, a distance between the center of the first reference hole A' and the center of the second reference hole B' is defined as the first distance 212'.

The second baseline 214' is determined by the first baseline 211', the first reference hole A', and the second distance 213'. The second baseline 214' intersects with the first baseline 211' on the baseplate 210'. In some embodiments, the second baseline 214' intersects with the first baseline 211' at right angles on the baseplate 210'.

In the first embodiment, the second baseline 214' is located on the opposite side to the second reference hole B', sandwiching the first reference hole A' therebetween, and intersects with the first baseline 211' at the second distance 213' from the first reference hole A'. In this case, the second distance 213' is shorter than the first distance 212'.

In order to determine the set position for arranging the optical element 215' on the baseplate 210', the first reference hole A' and the second reference hole B' are needed. However, when the baseplate 210' is a PCB, it is hard to form the first reference hole A' and the second reference hole B' with precise position and size.

Therefore, in some embodiments, the first reference hole A' and the second reference hole B' are provided on the baseplate 210' by mounting the alignment plate 220', on which the first reference hole A' and the second reference hole B' are precisely formed, on the baseplate 210'. That is, the alignment plate 220' serves the precisely-formed first reference hole A' and second reference hole B' to the baseplate 210'. The first reference hole A' and the second reference hole B' formed on the alignment plate 220' can be used as the reference for determining the set position on the baseplate 210'. The baseplate 210' with the alignment plate 220' arranged thereon is shown in FIG. 4B.

In the first embodiment, the method of aligning an optical element further includes steps of preparing an optical-fiber-fixing block 300' including an optical fiber 340' and a lens unit 320' mounted thereon in a fixed manner, a first post C' to be inserted into the first reference hole A', and a second post D' to be inserted into the second reference hole B' and mounting the optical-fiber-fixing block 300' on the baseplate 210' (Step S130). In some embodiments, the second post D' is inserted into the second reference hole B' in a looser manner than the first post C' is inserted into the first reference hole A'.

In some embodiments, the first reference hole A' and the second reference hole B' are arranged in the length direction of the optical fiber 340'. Further, the first post C' and the second post D' are arranged along the length direction of the optical fiber 340'. In this case, the length direction of the optical fiber 340' means the length direction of a portion of the optical fiber 340' that is mounted on the optical-fiber-fixing block 300' in a fixed manner. Such an arrangement reduces an unnecessary space in the optical alignment.

When the first reference hole A' and the second reference hole B' are formed on the alignment plate 220', the optical-fiber-fixing block 300' and the alignment plate 220' are coupled with each other by the first post C' being inserted into the first reference hole A' and the second post D' being inserted into the second reference hole B'. The first post C' is tightly inserted into the first reference hole A'. However, the second post D' is inserted into the second reference hole B' in s looser manner than the first post C' is inserted into the first reference hole A'.

In some embodiments, the diameter (size) of the second post D' is smaller than the diameter (size) of the first post C'. In some embodiments, the diameter (size) of the second reference hole B' is larger than the diameter (size) of the first reference hole A'.

Figure 5:
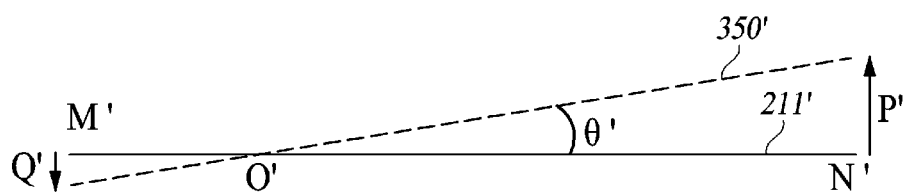
FIG. 5 is a schematic diagram for illustrating the method of aligning an optical element, according to the first embodiment.
Figure 6:
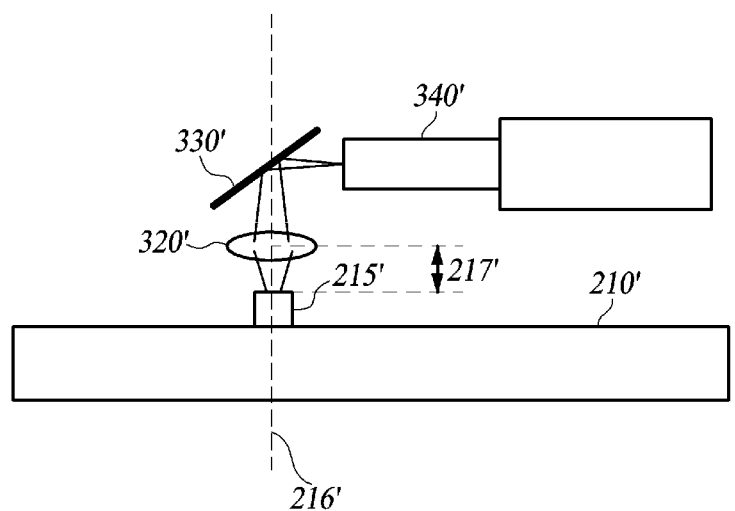
FIG. 6 is a schematic diagram for illustrating an optical alignment of an optical element and a lens unit, according to the first embodiment.

FIG. 5 is a schematic diagram for illustrating the method of aligning an optical element, according to the first embodiment; and FIG. 6 is a schematic diagram for illustrating an optical alignment of the optical element 215' and the lens unit 320', according to the first embodiment.

In FIG. 6, a process of aligning the optical element 215' and the lens unit 320' when the optical element 215' includes a single optical element arranged on the baseplate 210' is described.

The optical element 215' is arranged at a point on the first baseline 211' apart from the first reference hole A' by the second distance 213'.

A line passing through the first post C' and the second post D' formed on the bottom of the optical-fiber-fixing block 300' is defined as a third baseline 350'. In some embodiments, a line passing through the center of the first post C' and the center of the second post D' is defined as the third baseline 350', and a distance between the center of the first post C' and the center of the second post D' is defined as the first distance 212'. That is, the distance between the center of the first post C' and the center of the second post D' is substantially equal to the distance between the center of the first reference hole A' and the center of the second reference hole B'.

The lens unit 320' is arranged on the third baseline 350' on a plan view of the optical-fiber-fixing block 300'. Specifically, the lens unit 320' is arranged on the third baseline 350' at the second distance 213' from the first post C'.

When the optical-fiber-fixing block 300' is mounted on the baseplate 210' or the alignment plate 220', the first post C' is tightly inserted into the first reference hole A'. However, the second post D' is inserted into the second reference hole B' in a looser manner than the first post C' is inserted into the first reference hole A'. Hence the second post D' is slightly movable in the second reference hole B'.

In consequence, the third baseline 350' is slightly movable in the clockwise direction or in the counterclockwise direction centering around the first reference hole A', and hence the first baseline 211' and the third baseline 350' may be coincident with each other or may not be coincident with each other.

A virtual line perpendicular to the first baseline 211' and the second baseline 214' and intersecting with the second baseline 214' is defined as a fourth baseline 216', and then, when the first baseline 211' and the third baseline 350' are coincident with each other, the optical element 215' and the lens unit 320' are arranged on the fourth baseline 216'. That is, the optical element 215' and the lens unit 320' are arranged on the same axial line.

In the first embodiment, the second distance 213' is shorter than the first distance 212'. That is, with respect to the first post C', the second post D' is relatively far and the lens unit 320' is relatively near, and hence even when a movement of the second post D' is large in the second reference hole B', a movement of the lens unit 320' is relatively small. Therefore, even when the first baseline 211' and the third baseline 350' are not coincident with each other at the second post D', a deviation between the optical element 215' and the lens unit 320' is relatively slight.

A ratio of the second distance 213' to the first distance 212' can be set in such a manner that the optical fiber 340' and the lens unit 320' are optically aligned with the optical element 215' within a tolerance range. The larger the difference between the first distance 212' and the second distance 213' is, the smaller a ratio of the movement of the lens unit 320' to the movement of the second post D' is. Therefore, a more precise alignment can be obtained by increasing the difference between the first distance 212' and the second distance 213'.

In some embodiments, the first distance 212' and the second distance 213' are not fixed in advance. A optical designer can set the first distance 212' and the second distance 213' to appropriate values and the ratio of the second distance 213' to the first distance 212' to an appropriate value, in such a manner that the optical element 215' and the optical fiber 340' are optically aligned with each other within a tolerance range according to a required specification.

In the first embodiment, by adopting a structure in which the second post D' is inserted into the second reference hole B' in a looser manner than the first post C' is inserted into the first reference hole A', a deformation can be prevented from being generated, which is normally generated when forcibly fitting the optical-fiber-fixing block 300' into the alignment plate 220' or the baseplate 210'. Accordingly, a precise optical alignment can be obtained and the durability can be improved.

In some embodiments, the lens unit 320', a reflecting member 330', and the optical fiber 340' are arranged in the optical-fiber-fixing block 300' in an optically aligned manner. The reflecting member 330' is, for example, a mirror or a prism.

The optical alignment allows light emitted from a facet of the optical fiber 340' to be deflected via the reflecting member 330' and to be focused onto the optical element 215' via the lens unit 320' or allows light emitted from the optical element 215' to be collimated or focused via the lens unit 320' and to be deflected via the reflecting member 330' such that the light reaches the facet of the optical fiber 340'. The former case where the optical element 215' is a light receiving element is shown in FIG. 6. For the latter case where the optical element 215' is a light emitting element, in some embodiments, the similar structure as the one shown in FIG. 6 can be used, and in some embodiments, a focusing lens is further used between the reflecting member 330' and the optical fiber 340'.

When the first baseline 211' and the third baseline 350' are coincident with each other, the optical element 215' and the lens unit 320' are arranged on the fourth baseline 216'. In this case, the optical element 215' and the lens unit 320' are arranged with a third distance 217' therebetween. The optical designer can set the third distance 217'.

When the alignment plate 220' is not used, the third distance 217' can be determined by the height from the bottom of the optical-fiber-fixing block 300' to the lens unit 320'. When the alignment plate 220' is used, the third distance 217' can be determined by a distance obtained by adding the height of the alignment plate 220' to the height from the bottom of the optical-fiber-fixing block 300' to the lens unit 320'. An operator can arrange the optical element 215' and the lens unit 320' with the third distance 217' maintained simply by coupling the optical-fiber-fixing block 300' with the fixed height or the combined structure of the optical-fiber-fixing block 300' and the alignment plate 220' with the baseplate 210'.

Referring back to FIG. 3, when the virtual line passing through the first post C' and the second post D' is defined as the third baseline 350', fixing posts for fixing the alignment plate 220' onto the baseplate 210' can be formed on the third baseline 350' in a row. With this structure, the volume of the transmission path expander 1' can be reduced. This will be described later.

The optical-fiber-fixing block 300' and the alignment plate 220' are described in more detail below.

Figure 7A:
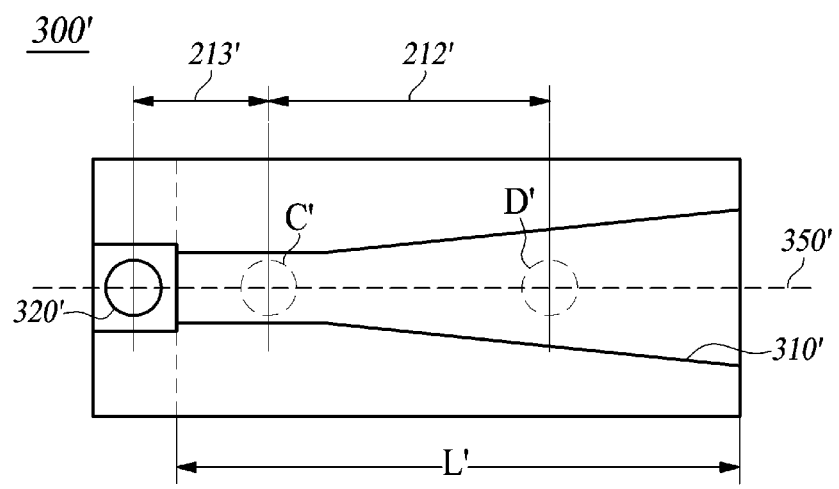
FIG. 7A is a top view of an optical-fiber-fixing block according to the first embodiment.
Figure 7B:
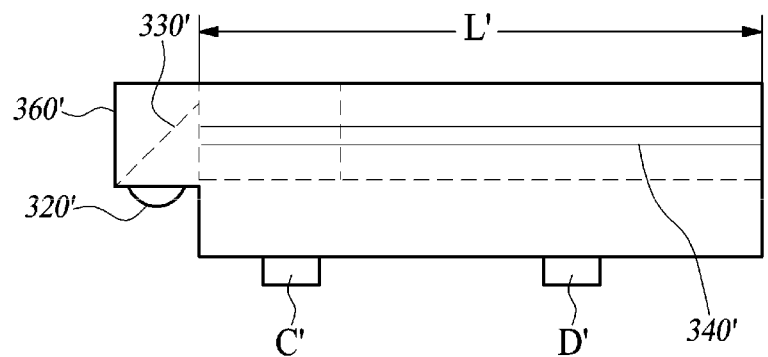
FIG. 7B is a side view of the optical-fiber-fixing block according to the first embodiment.

FIG. 7A is a top view of the optical-fiber-fixing block 300' according to the first embodiment; and FIG. 7B is a side view of the optical-fiber-fixing block 300' according to the first embodiment.

In some embodiments, the optical fiber 340' is inserted into the optical-fiber-fixing block 300' by an optical fiber guide portion 310' by a settlement length L' along the length direction. By ensuring the settlement length L' for settling the optical fiber 340' in the optical-fiber-fixing block 300', stability and durability of the optical transceiver can be achieved. The optical fiber guide portion 310' guides the optical fiber 340' such that the optical fiber 340' is arranged while ensuring the settlement length L' along the length direction.

In some embodiments, one side of the optical-fiber-fixing block 300' includes a protruded portion 360' protruding in the length direction of the optical fiber 340', and the lens unit 320' is mounted on the bottom of the protruded portion 360' in a fixed manner facing downward. That is, the lens unit 320' is mounted in a fixed manner to face a direction perpendicular to the length direction of the optical fiber 340'. By mounting this structure on the baseplate 210', the optical element 215' arranged at the set position of the baseplate 210' and the lens unit 320' can face each other.

In some embodiments, the length direction of optical fiber 340' settled and mounted in a fixed manner in the optical-fiber-fixing block 300' includes a direction same as the direction of the first baseline 211' or the third baseline 350'. As described above, the optical fiber 340' needs the settlement length L' of a predetermined length. Therefore, when the first post C', the second post D', the first reference hole A', and the second reference hole B' are arranged along the length direction, the first post C', the second post D', the first reference hole A', and the second reference hole B' share the space needed for the optical fiber 340', and hence the optical transceiver can be downsized.

Figure 8A:
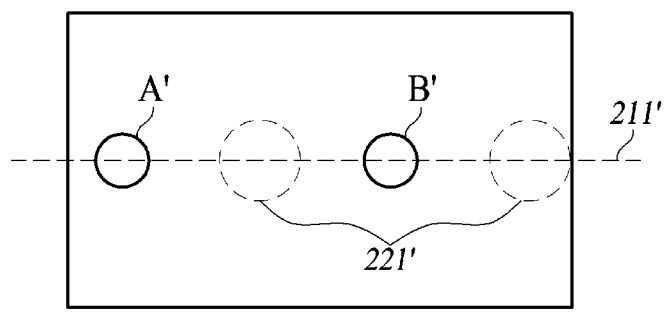
FIG. 8A is a top view of an alignment plate according to the first embodiment.
Figure 8B:
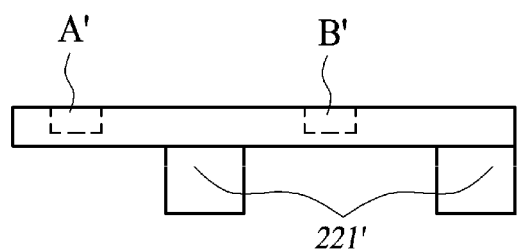
FIG. 8B is a side view of the alignment plate according to the first embodiment.

FIG. 8A is a top view of the alignment plate 220' according to the first embodiment; and FIG. 8B is a side view of the alignment plate 220' according to the first embodiment.

At least two fixing posts (or mounting portions) 221' are formed on the bottom of the alignment plate 220', and fixing holes are formed on the upper surface of the baseplate 210' at locations respectively corresponding to the fixing posts 221'. Therefore, the alignment plate 220' can be mounted on the baseplate 210' by the fixing posts 221' being inserted into the fixing holes. In this case, the fixing posts 221' and the fixing holes are arranged on the first baseline 211' in a row. With this structure, the volume of the optical transceiver manufactured by the alignment method according to some embodiments of the present disclosure can be reduced.

Although the first reference hole A' and the second reference hole B' should be processed in a precise manner, the alignment plate 220' itself is not necessarily to be manufactured in a precise manner. Therefore, the alignment plate 220' can be mass manufactured with low cost by using a plastic injection molding method. The mounting portions formed on the bottom of the alignment plate 220' are not necessarily to be manufactured in a precise manner, either. A manufacture can achieve an optical alignment of the optical element 215' and the optical fiber 340' simply by coupling the optical-fiber-fixing block 300' with the baseplate 210' on which the optical element 215' is mounted.

Figure 9:
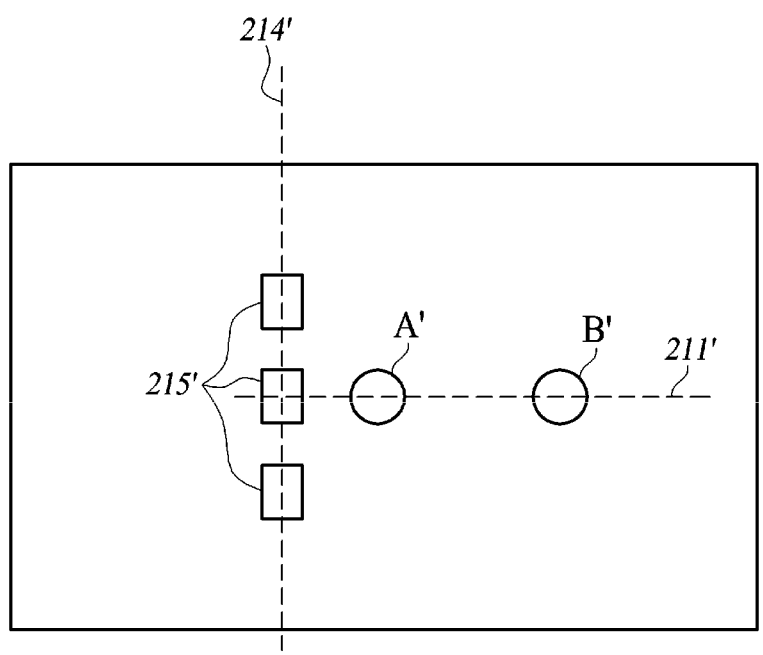
FIG. 9 is a plan view of the baseplate on which a plurality of optical elements is arranged, according to the first embodiment.

FIG. 9 is a plan view of the baseplate 210' on which a plurality of optical elements 215' is arranged, according to the first embodiment.

Although three optical elements 215' are shown in FIG. 9, the number of the optical elements 215' is not limited to three, but can be any number. As described above, the set position is determined by the first baseline 211' and the second baseline 214'. As shown in FIG. 9, the optical elements 215' are arranged in a row along the second baseline 214'; however, in some embodiments, the optical elements 215' are arranged in a plurality of rows along the second baseline 214'.

[Second Embodiment]

An optical transceiver 1 according to a second embodiment of the present disclosure has a structure similar to the transmission path expander 1' according to the first embodiment.

Figure 10:
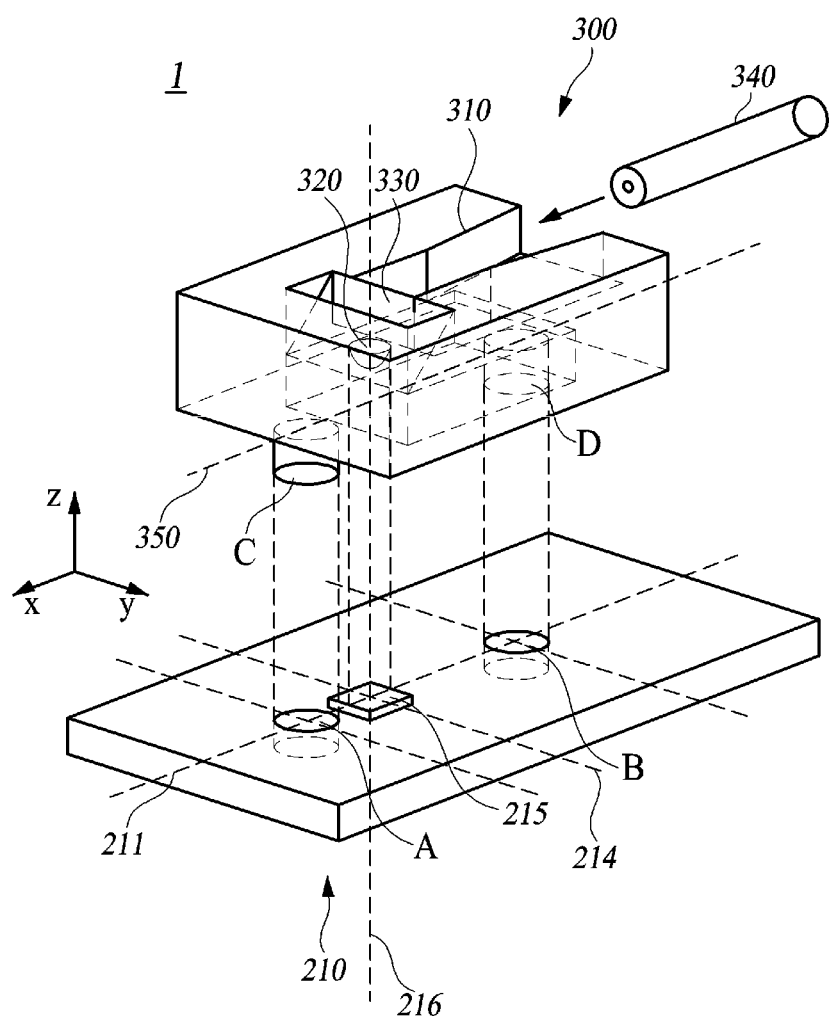
FIG. 10 is a perspective view of an optical transceiver according to a second embodiment of the present disclosure.
Figure 11:
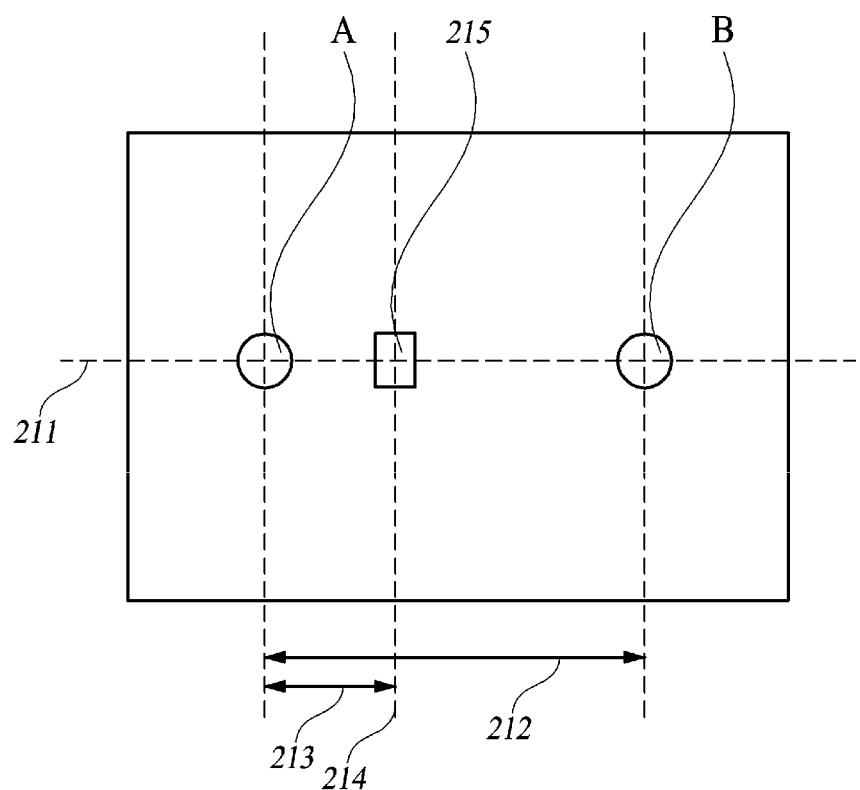
FIG. 11 is a plan view of a baseplate including a first reference hole and a second reference hole, on which an optical element is mounted, according to the second embodiment.
Figure 12:
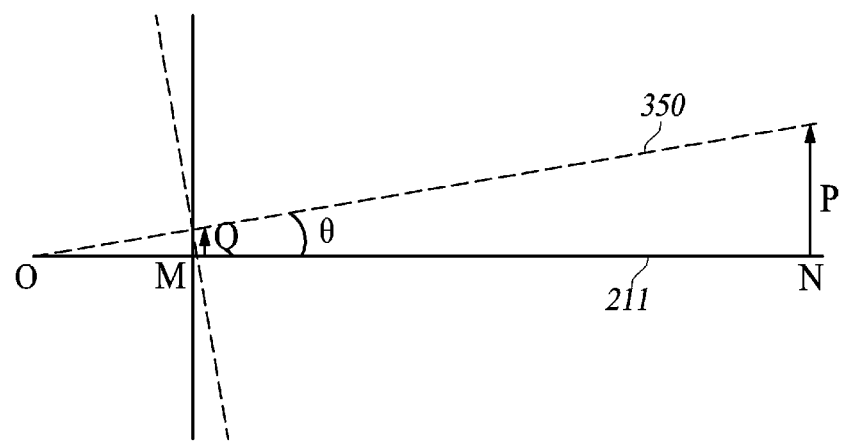
FIG. 12 is a schematic diagram for illustrating a method of aligning an optical element, according to the second embodiment.
Figure 13:
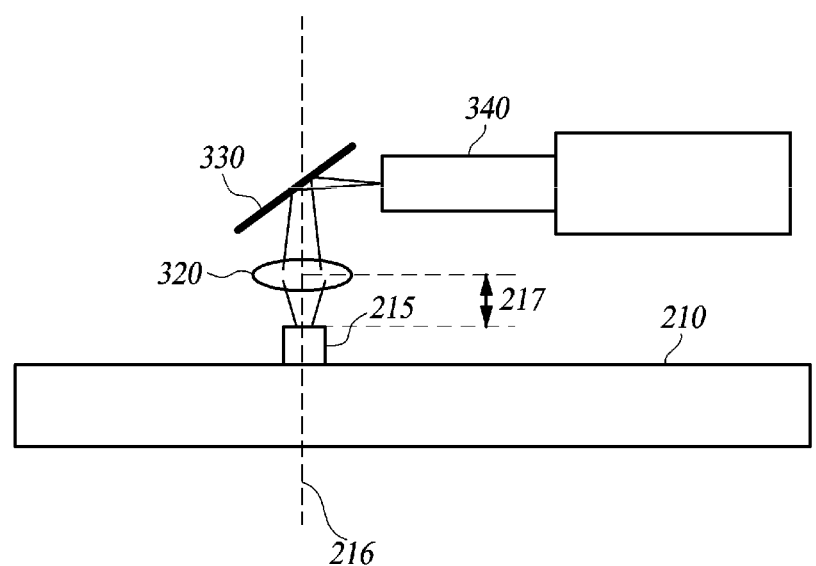
FIG. 13 is a schematic diagram for illustrating an optical alignment of an optical element and a lens unit, according to the second embodiment.

FIG. 10 is a perspective view of the optical transceiver 1 according to the second embodiment; FIG. 11 is a plan view of a baseplate 210 including a first reference hole A and a second reference hole B, on which an optical element 215 is mounted, according to the second embodiment; FIG. 12 is a schematic diagram for illustrating a method of aligning the optical element 215, according to the second embodiment; and FIG. 13 is a schematic diagram for illustrating an optical alignment of the optical element 215 and a lens unit 320, according to the second embodiment.

The baseplate 210 according to the second embodiment shown in FIG. 10 includes a first reference hole A and a second reference hole B along a first baseline 211 indicated on the upper surface and the optical element 215 arranged at the intersection of the first baseline 211 and a second baseline 214. An optical-fiber-fixing block 300 includes an optical fiber guide portion 310, a lens unit 320, a reflecting member 330, an optical fiber 340, and a first post C and a second post D arranged along a third baseline 350 indicated on the bottom of the optical-fiber-fixing block 300.

Referring to FIGS. 2, 10, and 11, the method of aligning an optical element according to the second embodiment includes a step of preparing the optical element 215 (S210) and a step of preparing the baseplate 210 including a set position for arranging the optical element 215, the first reference hole A, and the second reference hole B formed at the first distance 212 from the first reference hole A (Step S220).

The set position is determined by the first baseline 211 that passes the first reference hole A and the second reference hole B and the second baseline 214 that intersects with the first baseline 211 at a second distance 213 from the first reference hole A between the first reference hole A and the second reference hole B. In some embodiments, the second distance 213 is shorter than the first distance 212.

In the second embodiment, the method of aligning the optical element 215 further includes steps of preparing the optical-fiber-fixing block 300 including the optical fiber 340 and the lens unit 320 mounted thereon in a fixed manner, a first post C to be inserted into the first reference hole A, and a second post D to be inserted into the second reference hole B and mounting the optical-fiber-fixing block 300 on the baseplate 210 (Step S230).

The alignment method according to the second embodiment differs from the first embodiment in the set position where the optical element 215 is arranged. Effects of the second embodiment from this difference are described in detail below.

In the second embodiment, the posts C and D are portions protruding on one side of the optical-fiber-fixing block 300. In some embodiments, the posts C and D are injection molded in an integrated manner with the optical-fiber-fixing block 300.

The second post D is inserted into the second reference hole B in a looser manner than the first post C is inserted into the first reference hole A. In some embodiments, the diameter (size) of the second post D is smaller than the diameter (size) of the first post C such that the second post D is inserted into the second reference hole B in a looser manner than the first post C is inserted into the first reference hole A. In some embodiments, the diameter (size) of the second reference hole B is larger than the diameter (size) of the first reference hole A such that the second post D is inserted into the second reference hole B in a looser manner than the first post C is inserted into the first reference hole A.

In the same manner as the first embodiment, the first reference hole A and the second reference hole B are arranged along the length direction of the optical fiber 340. Further the first post C and the second post D are arranged along the length direction of the optical fiber 340. Unlike the conventional technology in which the hole 104 and the post 105 are arranged on a line extending in the direction of arranging the optical element 115, the arrangement according to the embodiments of the present disclosure can reduce the width of the baseplate 210, reducing an unnecessary space in the optical alignment.

The method of aligning the optical element 215 according to the second embodiment is further described with reference to FIGS. 10 and 12.

The first reference hole A, the second reference hole B, and the optical element 215 are shown on the baseplate 210 in FIG. 10. The coordinate axes are represented such that the length direction of the baseplate 210 is x-axis, the width direction is y-axis, and the thickness direction is z-axis.

A point O corresponding to the first reference hole A, a point N corresponding to the second reference hole B, and a point M corresponding to the optical element 215 are shown in FIG. 12. In some embodiments, the point M, the point N, and the point O are arranged on the first baseline 211.

An angle θ shown in FIG. 12 is an angle generated from the z-axis as the rotation axis, and a line that forms the angle θ with the first baseline 211 is the third baseline 350 that passes through the first post C and the second post D of the optical-fiber-fixing block 300. In some embodiments, a line passing through the center of the first post C and the center of the second post D is the third baseline 350.

In some embodiments, the distance between the center of the first post C and the center of the second post D is substantially equal to the first distance 212, and the distance between the center of the first post C and the center of the second post D is substantially equal to the distance between the center of the first reference hole A and the center of the second reference hole B.

When the optical-fiber-fixing block 300 is mounted on the baseplate 210, the first post C is tightly inserted into the first reference hole A. However, the second post D is inserted into the second reference hole B in a looser manner than the first post C is inserted into the first reference hole A. Hence the second post D is slightly movable in the second reference hole B.

In consequence, the third baseline 350 is slightly movable in the clockwise direction or in the counterclockwise direction centering around the z-axis, and hence the first baseline 211 and the third baseline 350 may be coincident with each other or may not be coincident with each other.

A fourth baseline 216 is formed in a direction parallel to the z-axis. The fourth baseline 216 is a virtual line that is perpendicular to the first baseline 211 and the second baseline 214 and that intersects with the second baseline 214. When the first baseline 211 and the third baseline 350 are coincident with each other, the optical element 215 and the lens unit 320 are arranged on the fourth baseline 216. That is, the optical element 215 and the lens unit 320 are arranged on the same axial line.

Features of the second embodiment are described in detail below with reference to the first embodiment.

The concept of the method of aligning an optical element is shown in FIG. 5.

A point O' corresponding to the first reference hole A', a point N' corresponding to the second reference hole B', and a point M' corresponding to the optical element 215' are shown in FIG. 5. The point M', the point N', and the point O' are arranged on the first baseline 211'.

When the optical-fiber-fixing block is slightly moved in the clockwise direction or in the counterclockwise direction by an angle θ' with respect to the point O', a movement of the axis in the length direction of the optical-fiber-fixing block is indicated by the third baseline 350'. A ratio of a line segment O'M' and a line segment O'N' is equal to a ratio of the distance for which the point M' is moved by Q' and the distance for which the point N' is moved by P'. Q' indicates the distance for which the lens unit is moved, and P' indicates the distance for which the post of the optical-fiber-fixing block is slightly moved in the round hole B' in a state in which the post is inserted into the hole B'.

In contrast, in the second embodiment, the third baseline 350 is shown in FIG. 12, which indicates a slight movement of the optical-fiber-fixing block 300 in the clockwise direction or in the counterclockwise direction by the angle θ with respect to the point O. A ratio of a line segment OM and a line segment ON can be represented by a ratio of the distance for which the point M is moved by Q and the distance for which the point N is moved by P.

Comparing this with the example shown in FIG. 5, if other conditions are the same (particularly, if P' and P have the same value), values Q and Q' that represent a deviation of the lens unit when there is a movement by P shows a relationship of Q'>Q, and hence in the case of the embodiments of the present disclosure, the deviation of the lens unit is smaller than that in the example shown in FIG. 5.

On the contrary, as the optical element and the lens unit are arranged outside the reference hole in the first embodiment, an interference with neighboring members in relatively free, and hence the manufacturing process can be simplified.

Therefore, one of ordinary skill in the pertinent art can select a desired mode by combining the embodiments shown in FIG. 12 and FIG. 5, and both cases are based on the similar technical idea.

As described above, the method of aligning an optical element with less deviation according to the second embodiment has following effects, which are equivalent to or more than those of the first embodiment.

Firstly, a deviation between the lens unit 320 and the optical element 215 generated when aligning them can be reduced. Secondary, if the deviation between the lens unit 320 and the optical element 215 is within the tolerance range, a tolerance can be increased when manufacturing the reference holes A and B of the baseplate 210 under this condition, and a component such as the alignment plate 220' of the first embodiment can be eliminated. That is, the first embodiment necessitates the alignment plate 220' due to the stringent precision for the optical alignment of the lens unit 320' and the optical element 215'; however, the second embodiment can eliminate such requirement. This makes the process of manufacturing the components easy, and at the same time, improves the economic feasibility. In addition, the volume of the entire optical transceiver can be reduced by arranging the optical element 215 between the reference hole A and the reference hole B. This complies with the recent trend of downsizing the information communication devices.

Figure 14A:
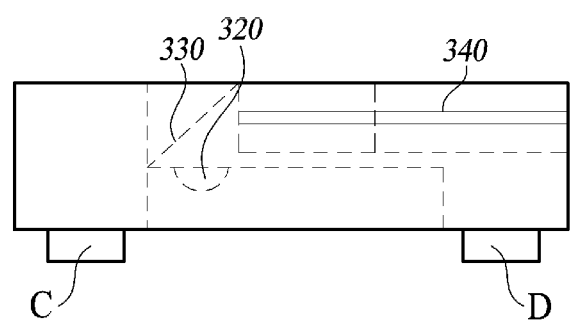
FIG. 14A is a side view of an optical-fiber-fixing block according to the second embodiment.
Figure 14B:
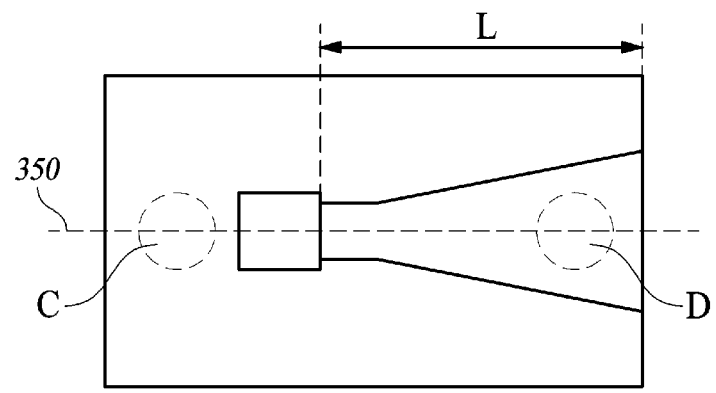
FIG. 14B is a plan view of the optical-fiber-fixing block according to the second embodiment.

FIG. 14A is a side view of the optical-fiber-fixing block 300 according to the second embodiment; and FIG. 14B is a plan view of the optical-fiber-fixing block 300 according to the second embodiment.

The optical fiber 340 can be mounted in the optical-fiber-fixing block 300 in a fixed manner. The optical-fiber-fixing block 300 includes the optical fiber guide portion 310 for guiding the optical fiber 340 on the inward side. The optical fiber guide portion 310 can be formed in a straight manner or in a tapered manner such that the area is increased from the inner side toward an opening portion on the outer side, to guide the facet of the optical fiber 340 to a predetermined position.

The optical fiber 340 is settled in the optical-fiber-fixing block 300 by being inserted along the length direction by the settlement length L by the optical fiber guide portion 310. The optical fiber 340 needs to ensure the settlement length L for settling the optical fiber 340 in the optical-fiber-fixing block 300 by a predetermined length. By ensuring the settlement length L, the stability and the durability of the optical fiber and the optical transceiver can be achieved. The optical fiber guide portion 310 guides the optical fiber 340 to be arranged while ensuring the settlement length L along the length direction.

The ratio of the second distance 213 to the first distance 212 can be set such that the optical fiber 340 and the optical element 215 are optically aligned with each other within the tolerance range.

In some embodiments, the length direction of the optical fiber 340 settled and mounted in the optical-fiber-fixing block 300 in a fixed manner includes a direction same as the direction of the first baseline 211 or the third baseline 350. As described above, the optical fiber 340 needs the settlement length L of a predetermined length.

When the first baseline 211 and the third baseline 350 are coincident with each other, the optical element 215 and the lens unit 320 are arranged on the fourth baseline 216. In this case, the optical element 215 and the lens unit 320 can be arranged while maintaining the third distance 217.

Figure 15:
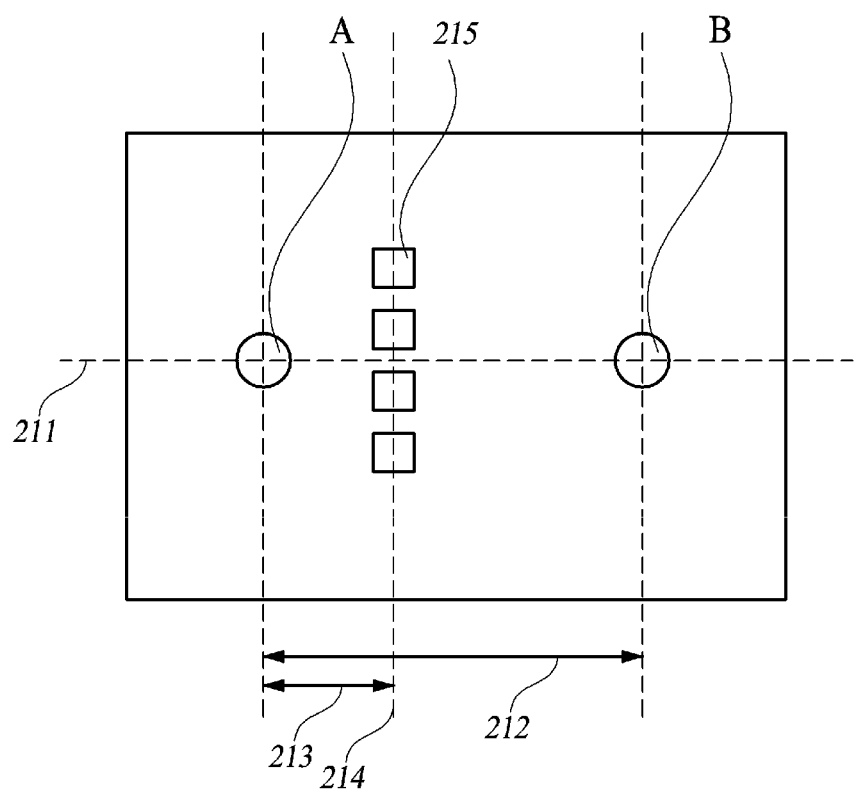
FIG. 15 is a plan view of the baseplate on which a plurality of optical elements is arranged, according to the second embodiment.

FIG. 15 is a plan view of the baseplate 210 on which a plurality of optical elements 215 is arranged, according to the second embodiment.

A case where the optical element 215 includes a plurality of optical elements, unlike the embodiment shown in FIG. 11, is shown in FIG. 15. In FIG. 15, four optical elements 215 are arranged in a row at regular intervals on the second baseline 214 on the baseplate 210. In some embodiments, unlike the example shown in FIG. 15, the optical elements 215 are arranged in a plurality of rows along the second baseline 214. The number of optical elements 215 can be any number depending on the required specification.

Other than the above-mentioned features, the configuration and the method of aligning the optical element according to the second embodiment is similar to those of the first embodiment.

[Third Embodiment]

Figure 16:
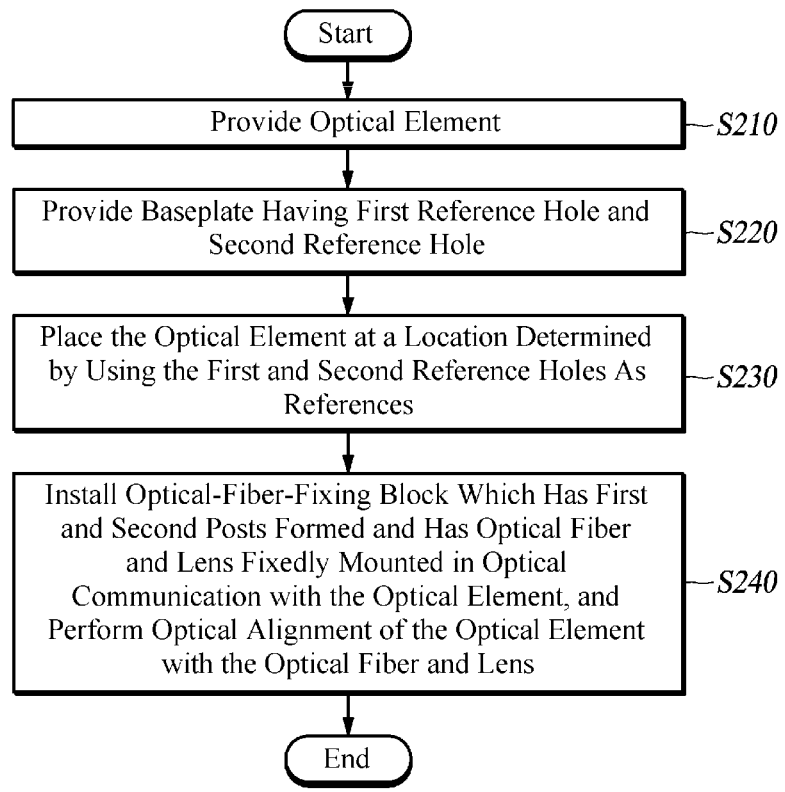
FIG. 16 is a flowchart of a method of aligning an optical element according to a third embodiment of the present disclosure.

FIG. 16 is a flowchart of a method of aligning an optical element according to a third embodiment of the present disclosure.

The method of aligning an optical element 215' according to the third embodiment includes a step of preparing an optical element 215' (Step S210), a step of preparing a baseplate 210' that includes a first reference hole A' and a second reference hole B' (Step S220), a step of arranging the optical element 215' at a position determined based on the first reference hole A' and the second reference hole B' on the baseplate 210' (Step S230), and a step of aligning an optical fiber 340' and the optical element 215' by mounting an optical-fiber-fixing block 300' including the optical fiber 340', a lens unit 320', a first post C', and a second post D' on the baseplate 210' (Step S240).

The optical alignment is achieved by the first post C' being inserted into the first reference hole A' and the second post D' being inserted into the second reference hole B'. In this case, the second post D' is inserted into the second reference hole B' in a looser manner than the first post C' is inserted into the first reference hole A'.

The position where the optical element 215' is arranged is determined by a first baseline 211' that passes through the first reference hole A' and the second reference hole B' and a second baseline 214' that intersects with the first baseline 211' at a second distance 213' from the first reference hole A' on the opposite side to the second reference hole B' with respect to the first reference hole A'. In some embodiments, the second distance 213' is shorter than the first distance 212'.

In some embodiments, the diameter (size) of the second post D' is smaller than the diameter (size) of the first post C'.

In some embodiments, the diameter (size) of the second reference hole B' is larger than the diameter (size) of the first reference hole A'.

Other than the above-mentioned features, the configuration and the method of aligning the optical element according to the third embodiment is similar to those of the first embodiment.

Embodiments of the present disclosure have been made in view of the above aspects, and it is an object of the present disclosure to provide a new method of aligning an optical element with an optical fiber based on a first reference hole, a second reference hole, a first baseline, and a second baseline.

It is another object of the present disclosure to increase the tolerance of the components of the optical transceiver by providing a new method of aligning an optical element, and eventually to downsize the optical transceiver to achieve the economic feasibility, manufacturing convenience, and the like.

The technical problems to be solved by the present disclosure are not limited to the above-mentioned, but other technical problems not mentioned above can be clearly understood by one of ordinary skill in the pertinent art from the following descriptions.

As described above, according to some embodiments of the present disclosure, an optical alignment of an optical element and an optical fiber can be performed with ease and an alignment error can be minimized.

Further, an optical transceiver manufactured by an alignment method according to some embodiments of the present disclosure can be downsized and manufactured by a simple assembly of inexpensive components, cutting down the manufacturing cost.

Although Steps S110 to S130 and Steps S210 to S240 are described to be sequentially performed in the examples shown in FIGS. 2 and 16 respectively, they merely instantiate a technical idea of some embodiments of the present disclosure. Therefore, a person having ordinary skill in the pertinent art could appreciate that various modifications, additions, and substitutions are possible by changing the sequences described in FIGS. 2 and 16 or by executing two or more steps in parallel, without departing from the gist and nature of the embodiments of the present disclosure, and hence FIGS. 2 and 16 are not limited to the illustrated chronological sequences.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An apparatus for aligning an optical element, the apparatus comprising a baseplate including:
   a set position for mounting at least one optical element;
   a first reference hole; and
   a second reference hole spaced by a first distance from the first reference hole, wherein
   the set position is determined by a first baseline that passes the first reference hole and the second reference hole and a second baseline that intersects with the first baseline at a second distance from the first reference hole on an opposite side to the second reference hole with respect to the first reference hole, and
   the second distance is shorter than the first distance.

2. The apparatus according to claim 1, further comprising an injection-molded alignment plate configured to be mounted on the baseplate, wherein
   the first reference hole and the second reference hole are formed on the alignment plate.

3. The apparatus according to claim 2, wherein
the alignment plate includes at least two fixing posts,
the baseplate further includes fixing holes respectively corresponding to the at least two fixing posts, and
the alignment plate is configured to be mounted on the baseplate by the at least two fixing posts being respectively inserted into the fixing holes.

4. The apparatus according to claim 3, wherein the fixing posts and the fixing holes are on the first baseline.

5. The apparatus according to claim 1, further comprising an optical-fiber-fixing block configured to mount at least an optical fiber and a lens unit in a fixed manner, wherein
the optical-fiber-fixing block includes
a first post configured to be inserted into the first reference hole, and
a second post configured to be inserted into the second reference hole, and
the second post is configured to be inserted into the second reference hole in a looser manner than the first post is inserted into the first reference hole.

6. The apparatus according to claim 5, wherein a size of the second post is smaller than a size of the first post.

7. The apparatus according to claim 5, wherein a size of the second reference hole is larger than a size of the first reference hole.

8. The apparatus according to claim 5, wherein a length direction of the optical fiber mounted in the optical-fiber-fixing block includes a direction same as a direction of the first baseline.

9. The apparatus according to claim 1, wherein
the at least one optical element includes a plurality of optical elements, and
the plurality of optical elements is configured to be mounted on the baseplate along the second baseline.

10. A method of aligning an optical element, the method comprising:
preparing a baseplate including a set position for mounting at least one optical element, a first reference hole, and a second reference hole spaced by a first distance from the first reference hole; and
mounting the at least one optical element at the set position on the baseplate, wherein
the set position is determined by a first baseline that passes the first reference hole and the second reference hole and a second baseline that intersects with the first baseline at a second distance from the first reference hole on an opposite side to the second reference hole with respect to the first reference hole, and
the second distance is shorter than the first distance.

11. The method according to claim 10, further comprising:
preparing an injection-molded alignment plate to be mounted on the baseplate; and
mounting the alignment plate on the baseplate, wherein
the first reference hole and the second reference hole are formed on the alignment plate.

12. The method according to claim 11, wherein
the alignment plate includes at least two fixing posts,
the baseplate further includes fixing holes respectively corresponding to the at least two fixing posts, and
the mounting the alignment plate includes inserting respectively the at least two fixing posts into the fixing holes.

13. The method according to claim 12, wherein the fixing posts and the fixing holes are on the first baseline.

14. The method according to claim 10, further comprising:
preparing an optical-fiber-fixing block for mounting at least an optical fiber and a lens unit in a fixed manner, the optical-fiber-fixing block including
a first post to be inserted into the first reference hole, and
a second post to be inserted into the second reference hole; and
mounting the optical-fiber-fixing block on the baseplate, wherein
the mounting the optical-fiber-fixing block includes inserting the second post into the second reference hole in a looser manner than inserting the first post into the first reference hole.

15. The method according to claim 14, wherein a size of the second post is smaller than a size of the first post.

16. The method according to claim 14, wherein a size of the second reference hole is larger than a size of the first reference hole.

17. The method according to claim 14, wherein a length direction of the optical fiber mounted in the optical-fiber-fixing block includes a direction same as a direction of the first baseline.

18. The method according to claim 10, wherein
the at least one optical element includes a plurality of optical elements, and
the mounting the at least one optical element includes mounting the plurality of optical elements along the second baseline.

19. A method of aligning an optical element, the method comprising:
preparing a baseplate including a set position for mounting at least one optical element, a first reference hole, and a second reference hole spaced by a first distance from the first reference hole;
mounting at least one optical element at the set position;
preparing an optical-fiber-fixing block for mounting at least an optical fiber and a lens unit in a fixed manner, the optical-fiber-fixing block including
a first post configured to be inserted into the first reference hole, and
a second post configured to be inserted into the second reference hole; and
mounting the optical-fiber-fixing block on the baseplate by inserting the first post into the first reference hole and inserting the second post into the second reference hole, wherein
the set position is determined by a first baseline that passes the first reference hole and the second reference hole and a second baseline that intersects with the first baseline at a second distance from the first reference hole on an opposite side to the second reference hole with respect to the first reference hole, and
the second distance is shorter than the first distance.

20. The method according to claim 19, wherein the inserting includes inserting the second post into the second reference hole in a looser manner than inserting the first post into the first reference hole.

* * * * *